(12) United States Patent
Lee et al.

(10) Patent No.: US 10,272,764 B2
(45) Date of Patent: *Apr. 30, 2019

(54) POWER TRANSMISSION APPARATUS OF HYBRID ELECTRIC VEHICLE

(71) Applicant: Hyundai Motor Company, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 181 days.

This patent is subject to a terminal disclaimer.

(21) Appl. No.: 15/372,632

(22) Filed: Dec. 8, 2016

(65) Prior Publication Data

US 2018/0065467 A1    Mar. 8, 2018

(30) Foreign Application Priority Data

Sep. 7, 2016 (KR) .................... 10-2016-0115068

(51) Int. Cl.
*B60K 6/48* (2007.10)
*F16H 3/00* (2006.01)
(Continued)

(52) U.S. Cl.
CPC .............. *B60K 6/543* (2013.01); *B60K 6/365* (2013.01); *B60K 6/48* (2013.01); *B60K 6/547* (2013.01);
(Continued)

(58) Field of Classification Search
CPC .......... B60K 6/543; B60K 6/365; B60K 6/48; B60K 6/547; B60K 2006/266; B60K 2006/4825; F16H 3/08; F16H 3/089; F16H 3/006; F16H 2003/007; F16H 37/065; F16H 3/085; F16H 2200/0039; F16H 2200/2005; F16H 3/725; F16H 2037/047; F16H 2037/048; B60Y 2200/92; B60Y 2400/72; B60Y 2400/73; B60Y 2400/732; Y10S 903/916; Y10S 903/919; Y10S 903/91; Y10S 903/918; Y10S 903/911; Y02T 10/6221; Y02T 10/6252

See application file for complete search history.

(56) References Cited

U.S. PATENT DOCUMENTS

| 6,499,370 B2 | 12/2002 | Bowen | |
|---|---|---|---|
| 2008/0070740 A1* | 3/2008 | Gumpoltsberger | F16H 3/66 475/276 |

(Continued)

FOREIGN PATENT DOCUMENTS

| JP | 2007-296881 A | 11/2007 |
|---|---|---|
| JP | 2015-174484 A | 10/2015 |

(Continued)

*Primary Examiner* — Jeffrey A Shapiro
(74) *Attorney, Agent, or Firm* — Morgan, Lewis & Bockius LLP

(57) ABSTRACT

A power transmitting apparatus of a hybrid electric vehicle includes an input device including four input shafts disposed with several input gears, torque converting device including a planetary gear set having rotation elements connected with the input shafts, and a shifting output device for shifting torques received from the input shafts and outputting the shifted torque.

8 Claims, 5 Drawing Sheets

(51) Int. Cl.
*B60K 6/543* (2007.10)
*B60K 6/547* (2007.10)
*F16H 3/085* (2006.01)
*F16H 37/06* (2006.01)
*F16H 3/72* (2006.01)
*B60K 6/365* (2007.10)
*F16H 3/089* (2006.01)

(52) U.S. Cl.
CPC .............. *F16H 3/085* (2013.01); *F16H 3/089* (2013.01); *F16H 3/725* (2013.01); *F16H 37/065* (2013.01); *B60K 2006/4825* (2013.01); *B60Y 2200/92* (2013.01); *B60Y 2400/72* (2013.01); *B60Y 2400/73* (2013.01); *F16H 3/006* (2013.01); *F16H 2200/0039* (2013.01); *F16H 2200/2005* (2013.01); *Y02T 10/6221* (2013.01); *Y02T 10/6252* (2013.01); *Y10S 903/91* (2013.01); *Y10S 903/918* (2013.01); *Y10S 903/919* (2013.01)

(56) References Cited

U.S. PATENT DOCUMENTS

| | | | | |
|---|---|---|---|---|
| 2010/0125020 | A1* | 5/2010 | Ikegami | B60K 6/365 477/3 |
| 2010/0130321 | A1* | 5/2010 | Eto | B60K 6/365 475/5 |
| 2012/0115677 | A1* | 5/2012 | Sakai | B60K 6/387 477/5 |
| 2015/0018157 | A1* | 1/2015 | Beck | F16H 3/66 475/275 |
| 2015/0018167 | A1 | 1/2015 | Toyoda et al. | |
| 2015/0165888 | A1* | 6/2015 | Lee | B60K 6/48 475/5 |
| 2015/0167803 | A1* | 6/2015 | Lee | F16H 61/0403 475/5 |
| 2015/0167804 | A1* | 6/2015 | Lee | B60K 6/365 475/5 |
| 2015/0167805 | A1* | 6/2015 | Lee | F16H 61/0403 475/5 |
| 2015/0167806 | A1* | 6/2015 | Lee | F16H 61/0403 475/5 |
| 2015/0184731 | A1* | 7/2015 | Lee | F16H 37/046 475/5 |
| 2015/0184732 | A1* | 7/2015 | Lee | F16H 37/046 475/5 |
| 2016/0009168 | A1* | 1/2016 | Lee | B60W 20/30 475/5 |
| 2016/0167503 | A1* | 6/2016 | Lee | B60K 6/365 475/5 |
| 2018/0154757 | A1* | 6/2018 | Lee | B60K 6/365 |

FOREIGN PATENT DOCUMENTS

| | | |
|---|---|---|
| KR | 10-2014-0133112 A | 11/2014 |
| WO | WO 2015/076068 A1 | 5/2015 |

* cited by examiner

FIG. 2

| Shift-stage | ECL | CL1 | CL2 | CL3 | SL1 1st | SL1 3rd | Remark |
|---|---|---|---|---|---|---|---|
| Engine-starting | ● | | | | ● | | |
| Neutral | ● | | | | ● | | |
| Neutral battery charging | ● | | | | ● | | |
| Fixed gear ratio mode 1 | ● | ● | ● | | ● | | |
| Fixed gear ratio mode 2 | ● | ● | ● | | | | |
| Fixed gear ratio mode 3 | ● | ● | ● | ● | | | Engine-driven, motor-assisted |
| Variable gear ratio mode 1 | ● | ● | ● | | ● | | |
| Variable gear ratio mode 2 | ● | ● | ● | ● | | ● | Engine-driven, motor-driven |
| EV mode 1 | | ● | ● | | ● | | |
| EV mode 2 | | ● | ● | ● | | | |
| EV mode 3 | | ● | ● | | | ● | motor-driven |
| EV mode R | | ● | ● | | ● | | motor-driven(reverse) |

FIG. 4

| Shift-stage | ECL | CL1 | CL2 | CL3 | SL1 1st | SL1 3rd | SL2 REV | Remark |
|---|---|---|---|---|---|---|---|---|
| Engine-starting | ● | ● | | | | | | |
| Neutral | ● | | | | ● | | | |
| Neutral battery charging | ● | | | | ● | | | |
| Fixed gear ratio mode 1 | ● | ● | ● | | ● | | | Engine-driven, motor-assisted |
| Fixed gear ratio mode 2 | ● | ● | ● | | ● | | | Engine-driven, motor-assisted |
| Fixed gear ratio mode 3 | ● | ● | ● | ● | | | | Engine-driven, motor-assisted |
| Fixed gear ratio mode R | ● | ● | ● | | | | ● | Engine-driven, motor-assisted |
| Variable gear ratio mode 1 | ● | | ● | | ● | | | Engine-driven, motor-driven |
| Variable gear ratio mode 2 | ● | | ● | | | ● | | Engine-driven, motor-driven |
| Variable gear ratio mode R | ● | | ● | | | | ● | Engine-driven, motor-driven |
| EV mode 1 | | ● | ● | | ● | | | motor-driven |
| EV mode 2 | | ● | ● | ● | | | | motor-driven |
| EV mode 3 | | ● | ● | | | ● | | motor-driven |
| EV mode R | | ● | ● | | | | ● | motor-driven(reverse) |

POWER TRANSMISSION APPARATUS OF HYBRID ELECTRIC VEHICLE

CROSS-REFERENCE TO RELATED APPLICATION

The present application claims priority to Korean Patent Application No. 10-2016-0115068 filed on Sep. 7, 2016, the entire contents of which is incorporated herein for all purposes by this reference.

NAMES OF THE PARTIES TO A JOINT RESEARCH AGREEMENT

Hyundai Motor Company and KIA Motors Corporation were parties to a joint research agreement prior to the effective filing date of the instant application.

BACKGROUND OF THE INVENTION

Field of the Invention

The present invention relates to a power transmission apparatus of a hybrid electric vehicle.

Description of Related Art

An environmentally-friendly technology of a vehicle is a core technology which controls survival of a future automobile industry, and advanced car makers have focused their energy on the development of an environmentally-friendly vehicle to achieve environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

The hybrid electric vehicle generally uses an engine and a motor/generator, and uses as a primary power source a motor/generator having a relatively excellent low-speed torque characteristic at a low speed and uses as the primary power source an engine having a relatively excellent high-speed torque characteristic at a high speed.

As a result, the hybrid electric vehicle is excellent in fuel efficiency enhancement and reduction of exhaust gas because an operation of the engine using fossil fuel stops and the motor/generator is used at a low-speed section.

A double clutch transmission (DCT) may be an example of a transmission applicable to such a hybrid electric vehicle. Such a DCT includes two clutches applied to a manual transmission scheme, and thereby enhances efficiency and convenience.

The DCT alternatingly activates odd-numbered shift-stages and even-numbered shift-stages by alternatingly operating two clutches, and thereby improves continuity in torque transmission.

However, the DCT shows relatively high degree of clutch wear and energy loss in starting of a vehicle and rearward slip in starting of a vehicle on a slant. In addition, the DCT typically is typically controlled with a short shift-control period considering low heat capacity, and thus may easily show a shift shock.

In addition, in order to apply the DCT to a hybrid electric vehicle, an appropriate arrangement of a motor/generator as a power source must be devised.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a hybrid electric vehicle having advantages of smooth starting and shifting of a vehicle and improvement of fuel consumption and acceleration performance.

A power transmission apparatus of a hybrid electric vehicle according to an exemplary embodiment of the present invention includes an input device, a torque converting unit, and a shifting output device. The input device may include a first input shaft selectively connectable with an the engine and the motor/generator, a second input shaft selectively connectable with the motor/generator, a third input shaft fixedly disposed with at least one input gear, and a fourth input shaft selectively connectable with the first input shaft and fixedly disposed with one input gear. The torque converting device may include a planetary gear set having a first rotation element connected with the second input shaft, a second rotation element connected with the third input shaft, and a third rotation element connected with the first input shaft. The shifting output device may shift torques received from the third and fourth input shafts and output a shifted torque.

The second and third input shafts of the input device may be formed as hollows shaft;

The first, second, and third input shafts may be coaxially disposed in an order of the first, second, and third input shafts in a radial direction; and The fourth input shaft may be formed as a hollow shaft, disposed rearward to the second and third input shafts, and coaxially disposed with the first input shaft.

The torque converting device may be disposed on the first input shaft at a location between the second and third input shafts and the fourth input shaft.

The torque converting device may be a single pinion planetary gear set having a sun gear as the first rotation element, a planet carrier as the second rotation element, and a ring gear as the third rotation element.

The shifting output device may include a first shifting output device that includes a first output shaft disposed in parallel with the first input shaft, one shifting gear fixedly disposed on the first output shaft and externally engaged with the one input gear on the fourth input shaft, two shifting gears rotatably disposed on the first output shaft, externally engaged with two input gear fixedly formed on the third input shaft, and selectively synchronized with the first output shaft, and a first output gear fixedly disposed at an upstream portion of the first output shaft.

The shifting output device may include a second shifting output device that includes a second output shaft disposed in parallel with the first input shaft, reverse speed shifting gear rotatably disposed on the second output shaft, selectively synchronized with the second output shaft, a reverse speed idle shaft disposed in parallel with the second output shaft, a reverse speed idle gear rotatably disposed on the reverse speed idle shaft and externally engaged with the one of the at least one input gear on the third input shaft and the reverse shifting gear, and a second output gear fixedly disposed at an upstream portion of the second output shaft.

The shifting output device may include first and second shifting output devices. The first shifting output device may include a first output shaft disposed in parallel with the first input shaft, two shifting gear rotatably disposed on the first output shaft, externally engaged with two input gears on the third input shaft, and selectively synchronized with the first output shaft by a first synchronizer, and a first output gear fixedly disposed at an upstream portion of the first output shaft; and The second shifting output device may include a second output shaft disposed in parallel with the first input shaft, one shifting gear fixedly disposed on the second output shaft and externally engaged with the one input shaft on the fourth input shaft, a reverse speed shifting gear rotatably disposed on the second output shaft and selectively synchronized with the second output shaft by a second synchronizer, a reverse speed idle shaft disposed in parallel with the second output shaft, a reverse speed idle gear rotatably disposed on the reverse speed idle shaft and externally engaged with the reverse speed shifting gear and the one input gear on the third input shaft, and a second output gear fixedly disposed at an upstream portion of the second output shaft.

The at least one input gear fixedly disposed on the third input shaft may include a first input gear acting as an input gear for the first forward speed and a second input gear acting as an input gear for the third forward speed. The one input gear fixedly disposed on the first input shaft may be a third input gear acting as an input gear for the second forward speed.

The shifting output device may include a first shifting output that includes a first output shaft disposed in parallel with the first input shaft, a second forward speed shifting gear fixedly disposed with the first output shaft and externally engaged with the third input gear, first forward and third speed shifting gears externally engaged with the first and second input gears, and selectively synchronized with the first output shaft by a first synchronizer, and a first output gear fixedly disposed at an upstream portion of the first output shaft.

The shifting output device may further include a second shifting output device that includes a second output shaft disposed in parallel with the first input shaft, a reverse speed shifting gear rotatably disposed on the second output shaft and selectively synchronized with the second output shaft by second synchronizer, a reverse speed idle shaft disposed in parallel with the second output shaft, a reverse speed idle gear rotatably disposed on the reverse speed idle shaft and externally engaged with the first input gear and the reverse speed shifting gear, and a second output gear fixedly disposed at an upstream portion of the second output shaft.

The shifting output device may include first and second shifting output devices. The first shifting output device may include a first output shaft disposed in parallel with the first input shaft, first forward and third speed shifting gears rotatably disposed on the first output shaft, externally engaged with the first and second input gears, and selectively synchronized with the first output shaft by a first synchronizer, and a first output gear fixedly disposed at an upstream portion of the first output shaft; and The second shifting output device may include a second output shaft disposed in parallel with the first input shaft, a second forward speed shifting gear fixedly disposed on the second output shaft and externally engaged with the third input gear, a reverse speed shifting gear rotatably disposed on the second output shaft and selectively synchronized with the second output shaft by a second synchronizer, a reverse speed idle shaft disposed in parallel with the second output shaft, a reverse speed idle gear rotatably disposed on the reverse speed idle shaft and externally engaged with the first input gear and the reverse speed shifting gear, and a second output gear fixedly disposed at an upstream portion of the second output shaft.

A power transmitting apparatus of a hybrid electric vehicle according to an exemplary embodiment of the present invention shows effective improvement of fuel consumption by realizing three shift-stages in a fixed gear ratio mode by using the engine ENG as a primary power source and the motor/generator as an auxiliary power source, two shift-stages in a variable gear ratio mode facilitating electronic continuously variable shifting by using the engine ENG and the motor/generator as power sources, and three shift-stages by only using the motor/generator.

A driving efficiency may be enhanced by operating a power transmitting apparatus in the variable gear ratio mode for city driving, and in the fixed gear ratio mode for high speed driving.

In addition, smooth starting of a vehicle may be achieved by the engine ENG and the motor/generator connected with respective rotation elements of the planetary gear set.

When the motor/generator fails, a vehicle may be driven by the torque of the engine ENG.

In the fixed gear ratio mode, the torque of the motor/generator may be used as an auxiliary power source, improving an acceleration performance.

The reverse speed driving may be achieved by reversely driving the motor/generator MG. In addition, a reverse speed shifting device is separately included such that the reverse speed may be realized also in the fixed gear ratio and the variable gear ratio mode as well as the EV mode.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective shift-stages of a power transmitting apparatus of a hybrid electric vehicle according to a various exemplary embodiments of the present invention.

FIG. 4 is an operational chart for respective shift-stages of a power transmitting apparatus of a hybrid electric vehicle according to a various exemplary embodiments of the present invention.

Figure 1:
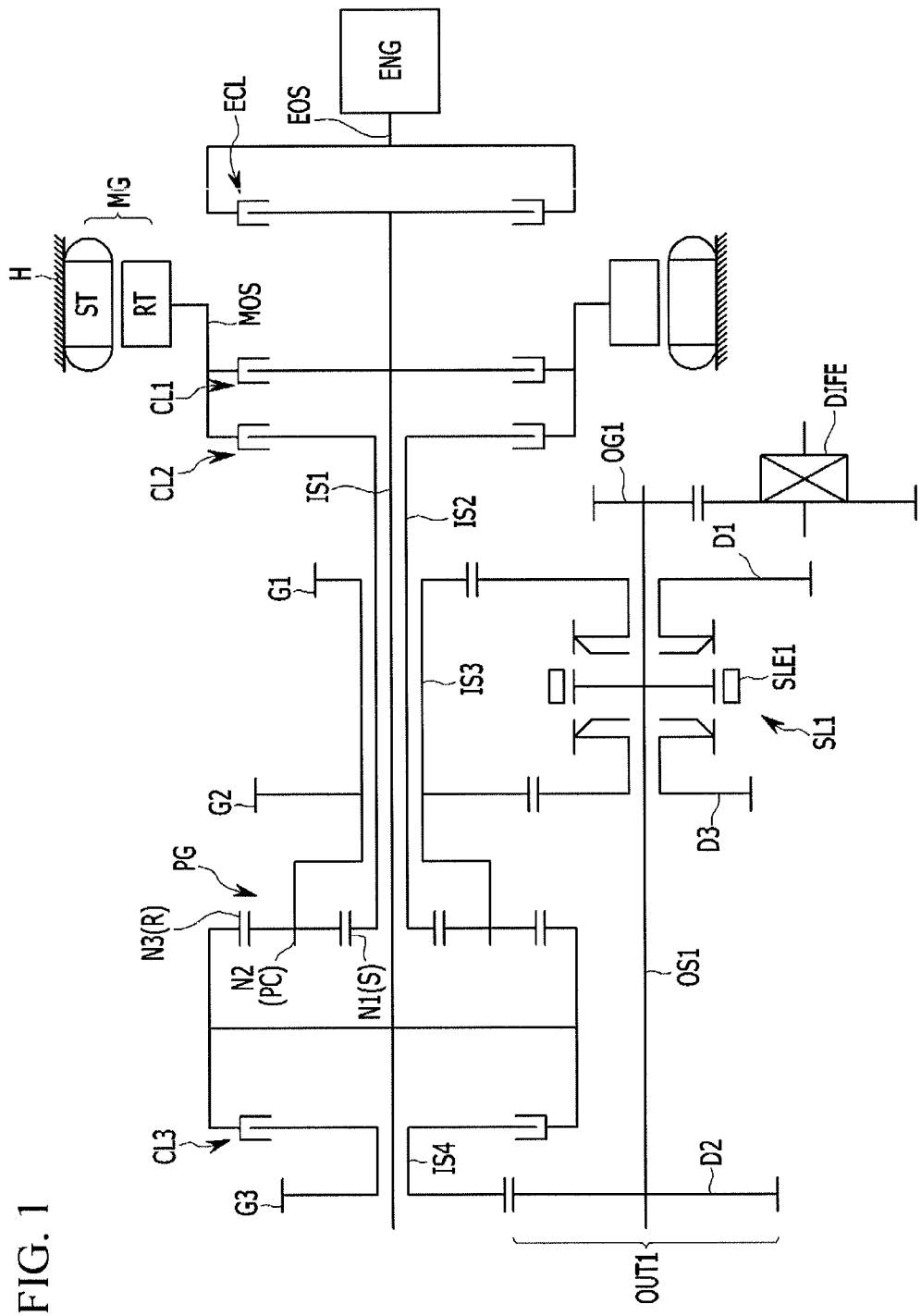
FIG. 1 is a schematic diagram of a power transmitting apparatus of a hybrid electric vehicle according to a various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive, and like reference numerals designate like elements throughout the specification.

In this detailed description, front or upstream of the transmission is referred to as a side adjacent to the engine, and rear or downstream of the transmission is referred to a side distal to the engine.

In the following description, dividing names of components into first, second and the like is to divide the names because the names of the components are the same as each other and an order thereof is not particularly limited.

FIG. 1 is a schematic diagram of a power transmitting apparatus of a hybrid electric vehicle according to an exemplary embodiment of the present invention.

Referring to FIG. 1, a power transmitting apparatus of a hybrid electric vehicle according to an exemplary embodiment of the present invention utilizes an engine ENG and a motor/generator MG as power sources, and includes an input device, a torque converting unit, and a shifting output device.

The engine ENG is a primary power source and a gasoline engine or a diesel engine using the existing fossil fuel may be used as the engine ENG.

The motor/generator MG is an electric supplementary drive unit (ESDU), and functions as a motor that generates a driving torque and also as a generator that generates electric energy producing mechanical reactive force. The motor/generator MG includes a stator ST fixed to a transmission housing H and a rotor RT rotatable inside the stator, where the rotor RT is directly connected with a motor output shaft MOS.

The input device includes first, second, third, and fourth input shafts IS1, IS2, IS3, and IS4.

The first input shaft IS1 is formed as a solid shaft, and disposed at a same axis with an engine output shaft EOS. An upstream portion of the first input shaft IS1 is selectively connectable with the engine output shaft EOS and the motor output shaft MOS respectively.

The second input shaft IS2 is formed as a hollow shaft, and disposed at an external circumference of the first input shaft IS1 rotatably and coaxially. An upstream portion of the second input shaft IS2 is selectively connectable with the motor output shaft MOS.

The third input shaft IS3 is formed as a hollow shaft, and disposed at an external circumference of the second input shaft IS2 rotatably and coaxially.

The fourth input shaft IS4 is formed as a hollow shaft, and disposed at an external circumference of the first input shaft IS1 rotatably and coaxially. An upstream portion of the fourth input shaft IS4 is selectively connectable with the first input shaft IS1.

First and second input gears G1 and G2 are fixedly disposed on the third input shaft IS3, and a third input gear G3 is fixedly disposed on the fourth input shaft IS4.

The first, second, and third input gears G1, G2, and G3 acts as input gears for respective shift-stages, where the first input gear G1 acts as an input gear for realizing the first forward speed and the reverse speed, the second input gear G2 as an input gear for realizing the third forward speed, and the third input gear G3 as an input gear for realizing the second forward speed.

A clutch device including an engine clutch ECL and first, second, and third clutches CL1, CL2, and CL3 is disposed between first, second, and fourth input shafts IS1, IS2, and IS4 and the power sources of the engine ENG and the motor/generator MG.

The engine clutch ECL is disposed between the engine output shaft EOS and the first input shaft IS1, and selectively transmits torque from the engine ENG to the first input shaft IS1.

The first clutch CL1 is disposed between the motor output shaft MOS and the first input shaft IS1, and selectively transmits torque from the motor/generator MG to the first input shaft IS1.

The second clutch CL2 is disposed between the motor output shaft MOS and the second input shaft IS2, and selectively transmits torque from the motor/generator MG to the second input shaft IS2.

The third clutch CL3 is disposed between the first input shaft IS1 and the fourth input shaft IS4, and selectively transmits torque from the first input shaft IS1 to the fourth input shaft IS4.

The engine clutch ECL and the first, second, and third clutches CL1, CL2, and CL3 may be realized as multi-plate hydraulic pressure friction devices that are frictionally engaged by hydraulic pressure.

The torque converting device is formed as a planetary gear set PG that is a single pinion planetary gear set having three rotation elements.

The three rotation element of the planetary gear set PG includes first, second, and third rotation elements N1, N2, and N3, where the first rotation element N1 is a sun gear, the second rotation element N2 is a planet carrier PC that rotatably supports one or more pinion gears externally engaged with the sun gear S, and the third rotation element N3 is a ring gear R engaged with the one or more pinion gears.

The first rotation element N1 is directly connected with the second input shaft IS2, the second rotation element N2 is directly connected with the third input shaft IS3, and the third rotation element N3 is directly connected with the first input shaft IS1.

When torques of the engine ENG and the motor/generator MG are selectively transmitted to the first rotation element N1 and the third rotation element N3 through the first and second input shafts IS1 and IS2, such input torques are converted and output to the third input shaft IS3 through the second rotation element N2.

The shifting output device includes a first shifting output devices OUT1 that receives torques from the first, second, and third input gears G1, G2, and G3 on the third and fourth input shafts IS3 and IS4 and outputs shifted torques.

The first shifting output device OUT1 includes a first output shaft OS1 and first forward speed, second speed, and third speed shifting gears D1, D2, and D3. The first output shaft OS1 is disposed in parallel with the first input shaft IS1, and the first forward speed, second speed, and third speed shifting gears D1, D2, and D3 are externally engaged with the first, second, and third input gears G1, G2, and G3 respectively.

The second forward speed shifting gear D2 is fixedly disposed on the first output shaft OS1, and the first forward speed and third speed shifting gears D1 and D3 are rotatably disposed on the first output shaft OS1.

The first shifting output device OUT1 further includes a synchronizing unit, a first synchronizer SL1 in the present exemplary embodiment, that is disposed on the first output shaft OS1 and selectively synchronizes the first forward speed and the third forward speed shifting gear D1 and D3 to the first output shaft OS1.

The first forward speed shifting gear D1 is externally engaged with the first input gear G1, and the third forward speed shifting gear D3 is externally engaged with the second input gear G2.

The second forward speed shifting gear D2 fixed on first output shaft OS1 is externally engaged the third input gear G3.

The torque shifted at the first shifting output device OUT1 is transmitted to a differential device DIFF through a first output gear OG1 fixed to an upstream portion of the first output shaft OS1.

The first synchronizer SL1 may be formed as a known scheme, and the sleeve SLE1 applied to the first synchronizer SL1 may be operated by an actuator that may be controlled by a transmission control device.

A power transmitting apparatus of a hybrid electric vehicle of such a scheme may enable a fixed gear ratio mode that simulates a double clutch transmission, a variable gear ratio mode (eCVT mode), and electric vehicle mode (EV mode).

FIG. 2 is an operational chart for respective shift-stages of a power transmitting apparatus of a hybrid electric vehicle according to a various exemplary embodiments of the present invention, and shifting operation of the power transmitting apparatus is hereinafter described in detail with reference to FIG. 2.

[Engine Starting]

In an engine starting mode, while the first forward speed shifting gear D1 is synchronized to the first output shaft OS1 by operating the first sleeve SLE1 of the first synchronizer SL1, the engine clutch ECL and the first clutch CL1 are operated.

Then, a driving torque of the motor/generator MG is transmitted to the engine ENG through the motor output shaft MOS, the first clutch CL1, the first input shaft IS1, the engine clutch ECL, and the engine output shaft EOS, and the engine ENG is started.

[Neutral]

In a neutral mode, while the first forward speed shifting gear D1 is synchronized to the first output shaft OS1 by operating the first sleeve SLE1 of the first synchronizer SL1, the engine clutch ECL is operated.

In the instant case, although the torque of the engine ENG is supplied to the third rotation element N3 of the planetary gear set PG through the first input shaft IS1, the first rotation element N1 is freely rotatable. Thus, the second rotation element N2 does not output any driving torque and therefore a neutral position is enabled.

[Neutral Position Battery Charging]

A neutral position battery charging mode is enabled while the engine ENG is started and running. While the first forward speed shifting gear D1 is synchronized to the first output shaft OS1 by operating the first sleeve SLE1 of the first synchronizer SL1, the engine clutch ECL and the second clutch CL2 is operated.

Then, the torque of the engine ENG is input to the third rotation element N3 of the planetary gear set PG through the first input shaft IS1, and the second rotation element N2 acts as a fixed element by being connected to the first output shaft OS1 due to the operation of the first synchronizer SL1.

In the instant case, the first rotation element N1 reversely rotates at a high speed, and drives the motor/generator MG through second clutch CL2 to generate electricity and enable electric charging.

[Fixed Gear Ratio Mode 1]

In a fixed gear ratio mode, the engine ENG supplies a primary drive-torque and the motor/generator MG supplies an auxiliary drive-torque.

In a fixed gear ratio mode 1, the first forward speed shifting gear D1 is synchronized to the first output shaft OS1 by operating the first sleeve SLE1 of the first synchronizer SL1, and the engine clutch ECL and the first and second clutches CL1 and CL2 are operated.

By such a control, the torque of the engine ENG and a portion of the torque of the motor/generator MG are input to the third rotation element N3 of the planetary gear set PG, and a portion of the torque of the motor/generator MG is input to the first rotation element N1 of the planetary gear set PG through the second input shaft IS2.

Consequently, torques are simultaneously input to the first and third rotation elements N1 and N3 of the planetary gear set PG, and the planetary gear set PG integrally rotates, outputting a same input torque to the third input shaft IS3 through the second rotation element N2.

Then, the torque is shifted while being transmitted to the first output shaft OS1 through the first forward speed shifting gear D1 externally engaged with the first input gear G1 on the third input shaft IS3, and the shifted torque is transmitted to the differential DIFF through the first output gear OG1 on the first output shaft OS1.

[Fixed Gear Ratio Mode 2]

For the fixed gear ratio mode 2 from the fixed gear ratio mode 1, the synchronous connection of the first forward speed shifting gear D1 to the first output shaft OS1 is released by releasing the first sleeve SLE1 of the first synchronizer SL1, the second clutch CL2 is released, and the third clutch CL3 is operated.

By such a control, the torque of the engine ENG and a portion of the torque of the motor/generator MG is input to the third rotation element N3 of the planetary gear set PG and at the same time, to the fourth input shaft IS4.

Then, a shifted torque is transmitted to the first output shaft OS1 through the second forward speed shifting gear D2 externally engaged with the third input gear G3 on the fourth input shaft IS4, and transmitted to the differential DIFF through the first output gear OG1 on the first output shaft OS1.

In the instant case, the planetary gear set PG does not affect to a shifting of the power transmitting apparatus since the first and second rotation elements N1 and N2 may freely rotate.

[Fixed Gear Ratio Mode 3]

For the fixed gear ratio mode 3 from the fixed gear ratio mode 2, the third forward speed shifting gear D3 is synchronized to the first output shaft OS1 by operating the first sleeve SLE1 of the first synchronizer SL1, the third clutch CL3 is released, and the second clutch CL2 is operated.

By such a control, the torque of the engine ENG and a portion of the torque of the motor/generator MG is input to the third rotation element N3 of the planetary gear set PG, and a portion of the torque of the motor/generator MG is input to the first rotation element N1 of the planetary gear set PG through the second input shaft IS2.

Consequently, the torque of the motor/generator MG is simultaneously input to the first and third rotation elements N1 and N3 of the planetary gear set PG, and the planetary gear set PG integrally rotates, outputting a same torque of the motor/generator MG to the third input shaft IS3 through the second rotation element N2.

Then, a shifted torque is transmitted to the first output shaft OS1 through the third forward speed shifting gear D3 externally engaged with the second input gear G2 on the third input shaft IS3, and transmitted to the differential DIFF through the first output gear OG1 on the first output shaft OS1.

[Variable Gear Ratio Mode 1]

In a variable gear ratio mode, the torque of the motor/generator MG is used as a driving power source as well as the torque of the engine ENG.

It is notable that the motor/generator MG may rotate at a different speed from the engine ENG, and in the instant case, the different speeds of the motor/generator MG and the engine ENG may be input to the planetary gear set PG such that the planetary gear may output a variable gear ratio achieving an electronic continuously variable transmission (eCVT) control.

That is, in a variable gear ratio mode 1, the first forward speed shifting gear D1 is synchronized to the first output shaft OS1 by operating the first sleeve SLE1 of the first synchronizer SL1, and the engine clutch ECL and the second clutch CL2 are operated.

In the instant case, by the operation of the engine clutch ECL, the torque of the engine ENG is input to the third rotation element N3 through the first input shaft IS1 of the planetary gear set PG, and by the operation of the second clutch CL2, the torque of the motor/generator MG is input to the first rotation element N1 through the second input shaft IS2.

Consequently, torques input to the first rotation element N1 and the third rotation element N3 react at the planetary gear set PG, and a shifted torque is output to the third input shaft IS3 through the second rotation element N2.

Then the shifted torque is transmitted to the first output shaft OS1 through the first forward speed shifting gear D1 externally engaged with the first input gear G1 on the third input shaft IS3, and transmitted to the differential DIFF through the first output gear OG1 on the first output shaft OS1.

[Variable Gear Ratio Mode 2]

For the variable gear ratio mode 2 from the variable gear ratio mode 1, the synchronous connection of the first forward speed shifting gear D1 to the first output shaft OS1 is released by operating the first sleeve SLE1 of the first synchronizer SL1, and the first output shaft OS1 and the third forward speed shifting gear D3 are connected.

A shifting from the variable gear ratio mode 1 to the variable gear ratio mode 2 is not directly performed and achieved by intermediately operating the clutches CL1, CL2, and CL3 in a state of the fixed gear ratio mode 2, to prevent a shift shock.

That is, the first, second, and third clutches CL1, CL2, and CL3 are firstly operated from the state of the variable gear ratio mode 1 to the state of the fixed gear ratio mode 2. Subsequently, the synchronous connection of the first output shaft OS1 and the first forward speed shifting gear D1 is released by releasing the first synchronizer SL1, and the first output shaft OS1 and the third forward speed shifting gear D3 are synchronized by operating the first synchronizer SL1.

When the first output shaft OS1 and the third forward speed shifting gear D3 are synchronized, the operation of the first clutch CL1 and the third clutch CL3 are released, and the second clutch CL2 is operated.

In the instant case, the torque of the engine ENG is input to the third rotation element N3 of the planetary gear set PG through the first input shaft IS1 by the operation of the engine clutch ECL, and the torque of the motor/generator MG is input to the first rotation element N1 through the second input shaft IS2 by the operation of the second clutch CL2.

Consequently, torques input to the first rotation element N1 and the third rotation element N3 react at the planetary gear set PG, and a shifted torque is output to the third input shaft IS3 through the second rotation element N2.

Then, a shifted torque is transmitted to the first output shaft OS1 through the third forward speed shifting gear D3 externally engaged with the second input gear G2 on the third input shaft IS3, and transmitted to the differential DIFF through the first output gear OG1 on the first output shaft OS1.

[EV Mode 1]

In an electric vehicle mode (EV mode), the engine ENG is stopped, and only the torque of the motor/generator MG is used to drive a vehicle.

In an EV mode 1, the first forward speed shifting gear D1 is synchronized to the first output shaft OS1 by operating the first sleeve SLE1 of the first synchronizer SL1, and the first and second clutches CL1 and CL2 are operated.

By such a control, the torque of the motor/generator MG is simultaneously input to the third rotation element N3 and the first rotation element N1 through the first input shaft IS1 and the second input shaft IS2.

Consequently, the torque of the motor/generator MG is simultaneously input to the first and third rotation elements N1 and N3 of the planetary gear set PG, and the planetary gear set PG integrally rotates, outputting a same torque of the motor/generator MG to the third input shaft IS3 through the second rotation element N2.

Then, a shifted torque is transmitted to the first output shaft OS1 through the first forward speed shifting gear D1 externally engaged with the first input gear G1 on the third input shaft IS3, and transmitted to the differential DIFF through the first output gear OG1 on the first output shaft OS1.

In such an EV mode 1, a gear ratio of the first input gear G1 and the first forward speed shifting gear D1 is activated.

[EV Mode 2]

For the EV mode 2 from the EV mode 1, the second clutch CL2 is released, the synchronous connection of the first forward speed shifting gear D1 to the first output shaft OS1 is released by releasing the first sleeve SLE1 of the first synchronizer SL1, and the third clutch CL3 is operated.

By such a control, the torque of the motor/generator MG is only input to the first input shaft IS1.

Then, a shifted torque is transmitted to the first output shaft OS1 through the second forward speed shifting gear D2 externally engaged with the third input gear G3 on the fourth input shaft IS4, and transmitted to the differential DIFF through the first output gear OG1 on the first output shaft OS1.

In the instant case, the planetary gear set PG does not affect to a shifting of the power transmission apparatus since the first and second rotation elements N1 and N2 may freely rotate.

[EV Mode 3]

For the EV mode 3 from the EV mode 2, the third forward speed shifting gear D3 is synchronized to the first output shaft OS1 by operating the first sleeve SLE1 of the first synchronizer SL1, and the second clutch CL2 is operated.

By such a control, the torque of the motor/generator MG is simultaneously input to the third rotation element N3 and the first rotation element N1 through the first input shaft IS1 and the second input shaft IS2.

Consequently, the torque of the motor/generator MG is simultaneously input to the first and third rotation elements N1 and N3 of the planetary gear set PG, and the planetary gear set PG integrally rotates, outputting a same torque of the motor/generator MG to the third input shaft IS3 through the second rotation element N2.

Then, a shifted torque is transmitted to the first output shaft OS1 through the third forward speed shifting gear D3 externally engaged with the second input gear G2 on the third input shaft IS3, and transmitted to the differential DIFF through the first output gear OG1 on the first output shaft OS1.

[EV Mode R (Reverse Speed; Motor is Reversely Driven)]

In an EV mode R, only a reversal torque of the motor/generator MG is used to drive a vehicle while the engine ENG is stopped.

In the EV mode R, while, the engine ENG is stopped, the first forward speed shifting gear D1 is synchronized to the first output shaft OS1 by operating the first sleeve SLE1 of the first synchronizer SL1, and the first and second clutches CL1 and CL2 are operated.

By such a control, a reversal torque of the motor/generator MG is simultaneously input to the third rotation element N3 and the first rotation element N1 through the first input shaft IS1 and the second input shaft IS2.

Consequently, the torque of the motor/generator MG is simultaneously input to the first and third rotation elements N1 and N3 of the planetary gear set PG, and the planetary gear set PG integrally rotates reversely, outputting a same torque of the motor/generator MG to the third input shaft IS3 through the second rotation element N2.

Then, a shifted torque is transmitted to the first output shaft OS1 through the first forward speed shifting gear D1 externally engaged with the first input gear G1 on the third input shaft IS3, and transmitted to the differential DIFF through the first output gear OG1 on the first output shaft OS1.

Shifting operation has been described above with reference to a case of sequential upshifting, and it will be understood that shifting operation of sequential downshifting may be achieved by an opposite control.

In addition, the reverse speed has not been described in connection with the fixed gear ratio mode and the variable gear ratio mode, which is because a separate reverse speed shifting device is not included.

Thus, the reverse speed may be achieved only in the EV mode of a power transmitting apparatus of a hybrid electric vehicle according to a various exemplary embodiments of the present invention.

Figure 3:
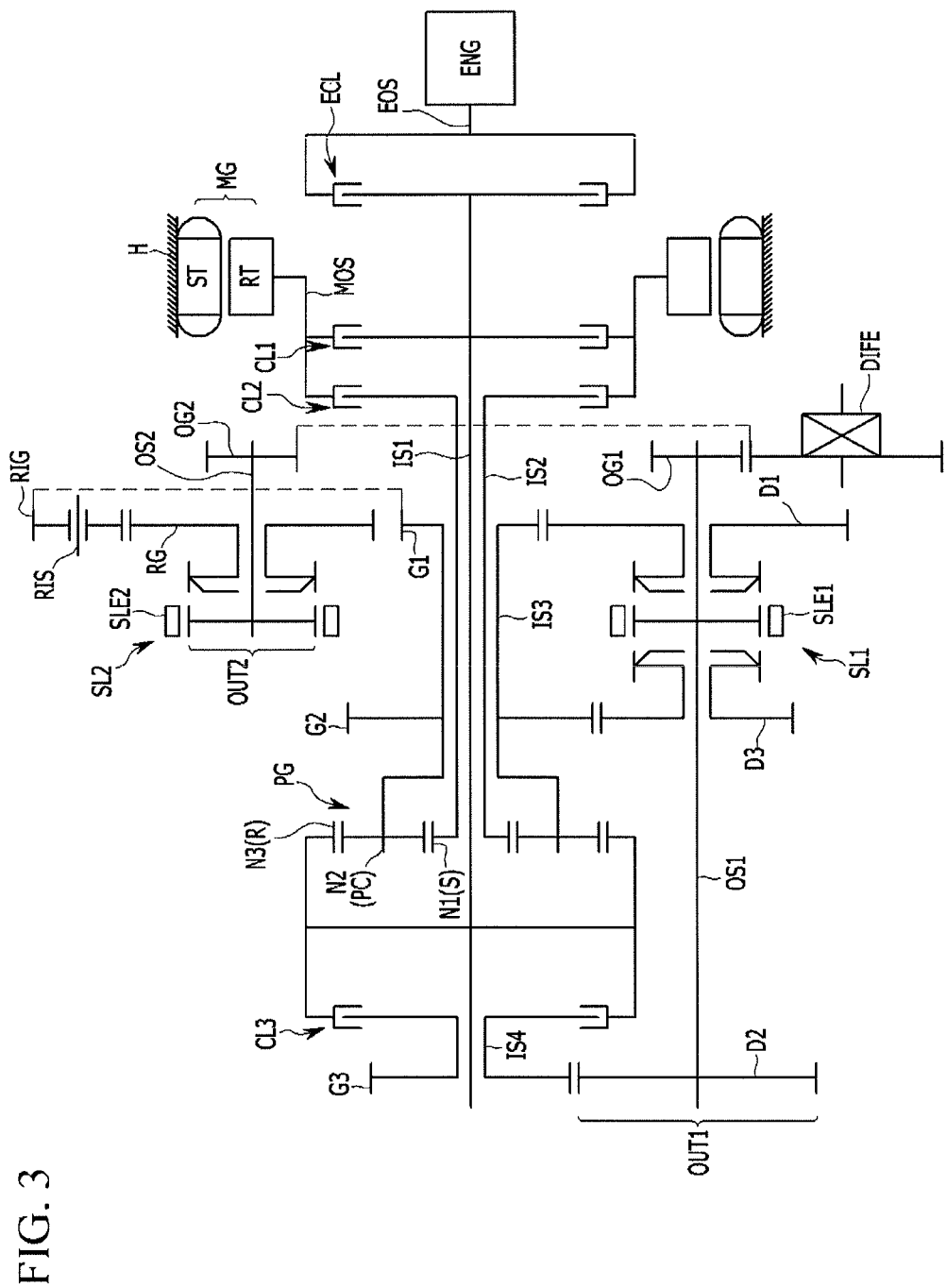
FIG. 3 is a schematic diagram of a power transmitting apparatus of a hybrid electric vehicle according to a various exemplary embodiments of the present invention.

FIG. 3 is a schematic diagram of a power transmitting apparatus of a hybrid electric vehicle according to a various exemplary embodiments of the present invention.

Referring to FIG. 3, a power transmitting apparatus of a hybrid electric vehicle according to a various exemplary embodiments of the present invention further includes second shifting output device OUT2 for shifting to a reverse speed, in comparison with a power transmitting apparatus of a hybrid electric vehicle according to a various exemplary embodiments of the present invention.

The second shifting output device OUT2 includes a second output shaft OS2 disposed in parallel with the first input shaft IS1, a reverse speed shifting gear RG rotatably disposed on the second output shaft OS2, and a second synchronizer SL2 for selectively synchronizing the reverse speed shifting gear RG to the second output shaft OS2.

The second shifting output device OUT2 further includes a reverse speed idle shaft RIS disposed in parallel with the second output shaft OS2 and a reverse speed idle gear RIG disposed on the reverse speed idle shaft RIS and externally engaged the reverse speed shifting gear RG and first input gear G1.

The reverse speed idle gear RIG is rotatably disposed on the reverse speed idle shaft RIS, and transmits a torque received from the first input gear G1 to the reverse speed shifting gear RG in a reverse rotation.

The torque shifted at the second shifting output device OUT2 is transmitted to the differential device DIFF disposed at an upstream portion of the second output shaft OS2, through a second output gear OG2.

The second synchronizer SL2 may be formed as a known scheme, and the sleeve SLE2 applied to the second synchronizer SL2 may be operated by an actuator that may be controlled by a transmission control device.

FIG. 4 is an operational chart for respective shift-stages of a power transmitting apparatus of a hybrid electric vehicle according to a various exemplary embodiments of the present invention.

Referring to FIG. 4, a power transmitting apparatus of a hybrid electric vehicle according to a various exemplary embodiments of the present invention further provides reverse speeds in the fixed gear ratio mode and variable gear ratio mode respectively, in comparison with the various exemplary embodiments.

Therefore, reverse speeds in such fixed gear ratio mode and variable gear ratio mode are hereinafter described in detail.

[Fixed Gear Ratio Mode R (Reverse Speed)]

In the fixed gear ratio mode R, the reverse speed shifting gear RG is synchronized to the second output shaft OS2 by operating the second sleeve SLE2 of the second synchronizer SL2, and then the engine clutch ECL and the first and second clutches CL1 and CL2 are operated.

By such a control, the torque of the engine ENG and a portion of the torque of the motor/generator MG is input to the third rotation element N3 of the planetary gear set PG, and a portion of the torque of the motor/generator MG is input to the first rotation element N1 of the planetary gear set PG through the second input shaft IS2.

Consequently, torques are simultaneously input to the first and third rotation elements N1 and N3 of the planetary gear set PG, and the planetary gear set PG integrally rotates, outputting a same torque of the motor/generator MG to the third input shaft IS3 through the second rotation element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

[Variable Gear Ratio Mode R (Reverse Speed)]

In the variable gear ratio mode R, the reverse speed shifting gear RG is synchronized to the second output shaft OS2 by operating the second sleeve SLE2 of the second synchronizer SL2, and then the engine clutch ECL and the second clutch CL2 are operated.

By such a control, the torque of the engine ENG is input to the third rotation element N3 of the planetary gear set PG through the first input shaft IS1 by the operation of the engine clutch ECL, and the torque of the motor/generator MG is input to the first rotation element N1 through the second input shaft IS2 by the operation of the second clutch CL2.

Consequently, torques input through the first rotation element N1 and the third rotation element N3 reacts at the planetary gear set PG, and a shifted torque obtained is output to the third input shaft IS3 through the second rotation element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

[EV Mode R (Reverse Speed; Motor-Driven)]

In an EV mode R, only a reversal torque of the motor/generator MG is used to drive a vehicle while the engine ENG is stopped.

In the EV mode R, while the engine ENG is stopped, the reverse speed shifting gear RG is synchronized to the second output shaft OS2 by operating the second sleeve SLE2 of the second synchronizer SL2, and the first and second clutches CL1 and CL2 are operated.

By such a control, the torque of the motor/generator MG is simultaneously input to the third rotation element N3 and the first rotation element N1 through the first input shaft IS1 and the second input shaft IS2.

Consequently, the torques of the motor/generator MG is simultaneously input to the first and third rotation elements N1 and N3 of the planetary gear set PG, and the planetary gear set PG integrally rotates reversely, outputting a same torque of the motor/generator MG to the third input shaft IS3 through the second rotation element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

Figure 5:
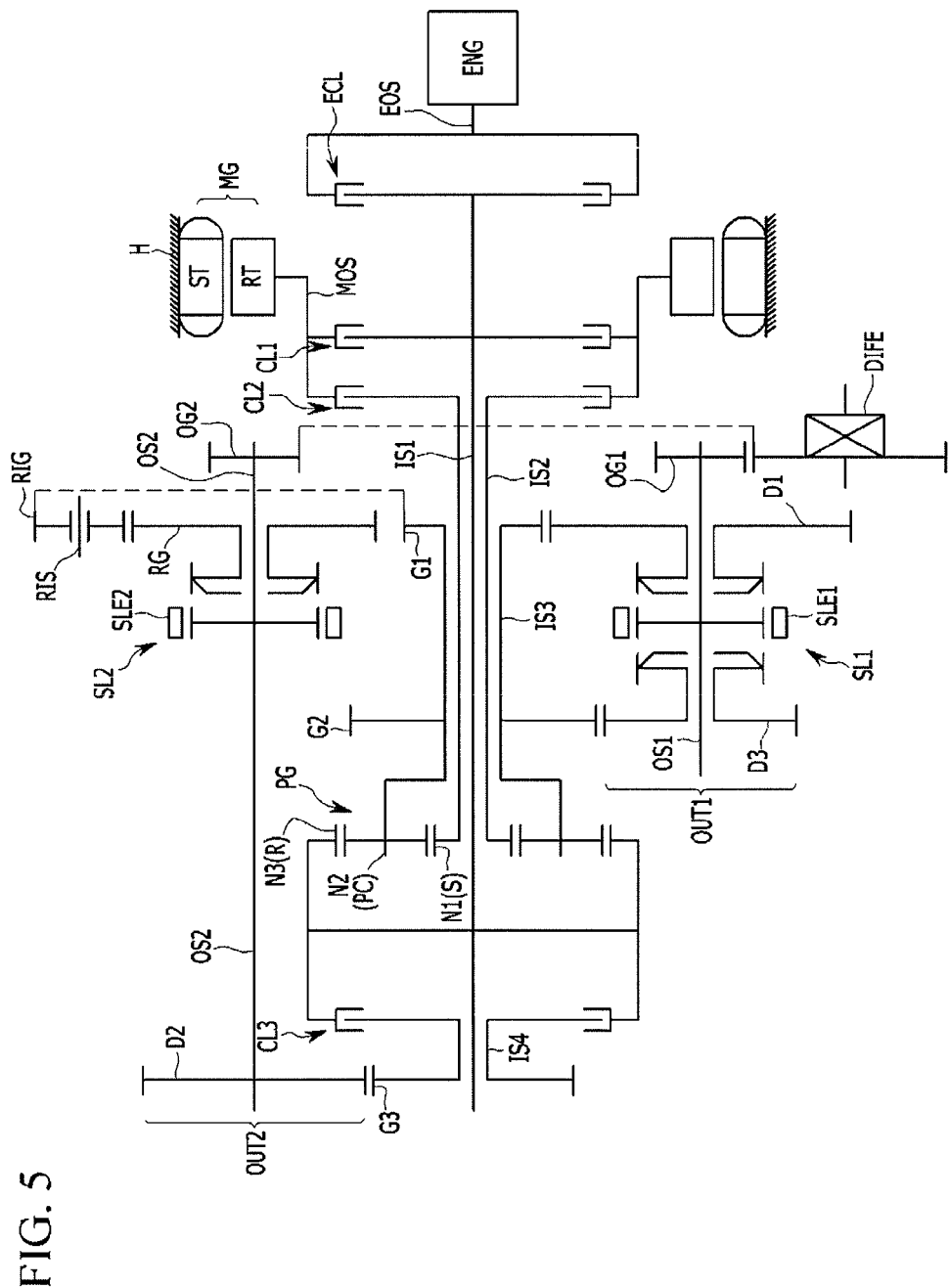
FIG. 5 is a schematic diagram of a power transmitting apparatus of a hybrid electric vehicle according to a various exemplary embodiments of the present invention.

FIG. 5 is a schematic diagram of a power transmitting apparatus of a hybrid electric vehicle according to a various exemplary embodiments of the present invention.

Referring to FIG. 5, according to a various exemplary embodiments, the second forward speed shifting gear D2 is fixedly disposed on the second output shaft OS2, while the second forward speed shifting gear D2 is disposed on the first output shaft OS1 in the various exemplary embodiments of the present invention.

Therefore, the various exemplary embodiments only differs from the various exemplary embodiments in that the second forward speed shifting gear D2 is disposed at a different location, and other arrangements and shifting operations are the same.

As described above, power transmitting apparatus of a hybrid electric vehicle according to an exemplary embodiment of the present invention shows effective improvement of fuel consumption by realizing three shift-stages in a fixed gear ratio mode by using the engine ENG as a primary power source and the motor/generator as an auxiliary power source, two shift-stages in a variable gear ratio mode facilitating electronic continuously variable shifting by using the engine ENG and the motor/generator as power sources, and three shift-stages by only using the motor/generator.

A driving efficiency may be enhanced by operating a power transmitting apparatus in the variable gear ratio mode for city driving, and in the fixed gear ratio mode for high speed driving.

In addition, smooth starting of a vehicle may be achieved by the engine ENG and the motor/generator connected with respective rotation elements of the planetary gear set.

When the motor/generator fails, a vehicle may be driven by the torque of the engine ENG.

In the fixed gear ratio mode, the torque of the motor/generator may be used as an auxiliary power source, improving an acceleration performance.

The reverse speed driving may be achieved by reversely driving the motor/generator MG. In addition, a reverse speed shifting device is separately included such that the reverse speed may be realized also in the fixed gear ratio and the variable gear ratio mode as well as the EV mode.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle including power sources of an engine and a motor/generator, including:
   an input device including a first input shaft selectively connectable with an engine and the motor/generator, a second input shaft selectively connectable with the motor/generator, a third input shaft fixedly disposed with at least one input gear, and a fourth input shaft selectively connectable with the first input shaft and fixedly disposed with one input gear;
   a torque converting device including a planetary gear set having a first rotation element connected with the second input shaft, a second rotation element connected with the third input shaft, and a third rotation element connected with the first input shaft; and
   a shifting output device for shifting torques received from the third and fourth input shafts and outputting a shifted torque,
   wherein the shifting output device includes:
      a first shifting output device including a first output shaft disposed in parallel with the first input shaft, two shifting gears rotatably disposed on the first output shaft, engaged with two input gears on the third input shaft, and selectively synchronized with the first output shaft by a first synchronizer, and a first output gear fixedly disposed at an upstream portion of the first output shaft; and
      a second shifting output device including a second output shaft disposed in parallel with the first input shaft, one shifting gear fixedly disposed on the second output shaft and engaged with the one input shaft on the fourth input shaft, a reverse speed shifting gear rotatably disposed on the second output shaft and selectively synchronized with the second output shaft by a second synchronizer, a reverse speed idle shaft disposed in parallel with the second output shaft, a reverse speed idle gear rotatably disposed on the reverse speed idle shaft and engaged with the reverse speed shifting gear and the one input gear on the third input shaft, and a second output gear fixedly disposed at an upstream portion of the second output shaft.

2. The power transmitting apparatus of claim 1, wherein the second and third input shafts of the input device are formed as hollows shaft;
   the first, second, and third input shafts are coaxially disposed in an order of the first, second, and third input shafts in a radial direction thereof; and
   the fourth input shaft is formed as a hollow shaft, disposed rearward to the second and third input shafts and coaxially disposed with the first input shaft.

3. The power transmitting apparatus of claim 1, wherein the torque converting device is disposed on the first input shaft at a location between the second and third input shafts and the fourth input shaft.

4. The power transmitting apparatus of claim 1, wherein the torque converting device is a single pinion planetary gear set having a sun gear as the first rotation element, a planet carrier as the second rotation element, and a ring gear as the third rotation element.

5. The power transmitting apparatus of claim 1, wherein the at least one input gear fixedly disposed on the third input shaft includes a first input gear acting as an input gear for a first forward speed and a second input gear acting as an input gear for a third forward speed; and
   the one input gear fixedly disposed on the first input shaft is a third input gear acting as an input gear for a second forward speed.

6. A power transmitting apparatus for a vehicle including power sources of an engine and a motor/generator, including:
   an input device including a first input shaft selectively connectable with an engine and the motor/generator, a second input shaft selectively connectable with the motor/generator, a third input shaft fixedly disposed with at least one input gear, and a fourth input shaft selectively connectable with the first input shaft and fixedly disposed with one input gear;
   a torque converting device including a planetary gear set having a first rotation element connected with the second input shaft, a second rotation element connected with the third input shaft, and a third rotation element connected with the first input shaft; and
   a shifting output device for shifting torques received from the third and fourth input shafts and outputting a shifted torque,
   wherein the at least one input gear fixedly disposed on the third input shaft includes a first input gear acting as an input gear for a first forward speed and a second input gear acting as an input gear for a third forward speed,
   wherein the one input gear fixedly disposed on the first input shaft is a third input gear acting as an input gear for a second forward speed, and
   wherein the shifting output device includes a first shifting output device including:
      a first output shaft disposed in parallel with the first input shaft;
      a second forward speed shifting gear fixedly disposed with the first output shaft and engaged with the third input gear;
      first forward and third speed shifting gears engaged with the first and second input gears, and selectively synchronized with the first output shaft by a first synchronizer; and
      a first output gear fixedly disposed at an upstream portion of the first output shaft.

7. The power transmitting apparatus of claim 6, wherein the shifting output device further includes a second shifting output device including:
   a second output shaft disposed in parallel with the first input shaft;
   a reverse speed shifting gear rotatably disposed on the second output shaft and selectively synchronized with the second output shaft by a second synchronizer;
   a reverse speed idle shaft disposed in parallel with the second output shaft;
   a reverse speed idle gear rotatably disposed on the reverse speed idle shaft and engaged with the first input gear and the reverse speed shifting gear; and
   a second output gear fixedly disposed at an upstream portion of the second output shaft.

8. A power transmitting apparatus for a vehicle including power sources of an engine and a motor/generator, including:
   an input device including a first input shaft selectively connectable with an engine and the motor/generator, a second input shaft selectively connectable with the motor/generator, a third input shaft fixedly disposed with at least one input gear, and a fourth input shaft selectively connectable with the first input shaft and fixedly disposed with one input gear;

a torque converting device including a planetary gear set having a first rotation element connected with the second input shaft, a second rotation element connected with the third input shaft, and a third rotation element connected with the first input shaft; and a shifting output device for shifting torques received from the third and fourth input shafts and outputting a shifted torque, wherein the at least one input gear fixedly disposed on the third input shaft includes a first input near acting as an input gear for a first forward speed and a second input gear acting as an input gear for a third forward speed, wherein the one input gear fixedly disposed on the first input shaft is a third input gear acting as an input gear for a second forward speed, and wherein the shifting output device includes:

a first shifting output device including a first output shaft disposed in parallel with the first input shaft, first forward and third speed shifting gears rotatably disposed on the first output shaft, engaged with the first and second input gears, and selectively synchronized with the first output shaft by a first synchronizer, and a first output gear fixedly disposed at an upstream portion of the first output shaft; and a second shifting output device including a second output shaft disposed in parallel with the first input shaft, a second forward speed shifting gear fixedly disposed on the second output shaft and engaged with the third input gear, a reverse speed shifting gear rotatably disposed on the second output shaft and selectively synchronized with the second output shaft by a second synchronizer, a reverse speed idle shaft disposed in parallel with the second output shaft, a reverse speed idle gear rotatably disposed on the reverse speed idle shaft and engaged with the first input gear and the reverse speed shifting gear, and a second output gear fixedly disposed at an upstream portion of the second output shaft.

* * * * *